US012750882B2

(12) United States Patent
Stefanatos et al.

(10) Patent No.: US 12,750,882 B2
(45) Date of Patent: Sep. 29, 2026

(54) SLOT DURATION ADAPTATION IN UNLICENSED FREQUENCY SPECTRUM

(71) Applicant: QUALCOMM Incorporated, San Diego, CA (US)

(72) Inventors: Stelios Stefanatos, San Diego, CA (US); Yisheng Xue, San Diego, CA (US); Shailesh Patil, San Diego, CA (US); Arthur Gubeskys, San Diego, CA (US); Shuanshuan Wu, San Diego, CA (US); Parisa Cheraghi, Cambridge (GB)

(73) Assignee: Qualcomm Incorporated, San Diego, CA (US)

( * ) Notice: Subject to any disclaimer, the term of this patent is extended or adjusted under 35 U.S.C. 154(b) by 602 days.

(21) Appl. No.: 18/252,356

(22) PCT Filed: Dec. 9, 2021

(86) PCT No.: PCT/US2021/072839
§ 371 (c)(1),
(2) Date: May 9, 2023

(87) PCT Pub. No.: WO2022/150240
PCT Pub. Date: Jul. 14, 2022

(65) Prior Publication Data

US 2023/0397251 A1 Dec. 7, 2023

(30) Foreign Application Priority Data

Jan. 7, 2021 (GR) .............................. 20210100011

(51) Int. Cl.
*H04W 74/0808* (2024.01)
*H04W 16/14* (2009.01)

(52) U.S. Cl.
CPC ....... *H04W 74/0808* (2013.01); *H04W 16/14* (2013.01)

(58) Field of Classification Search
CPC .............................. H04W 4/40; H04W 36/037
See application file for complete search history.

(56) References Cited

U.S. PATENT DOCUMENTS

2018/0176955 A1* 6/2018 Salem ............... H04W 74/0808
2018/0288805 A1* 10/2018 Bhorkar ............ H04W 74/0816
(Continued)

OTHER PUBLICATIONS

Apple: "Resource Allocation for V2X Broadcast and Groupcast Communication", 3GPP TSG RAN WG1 Meeting #94bis, R1-1811123, Resource Allocation for V2X Broadcast and Groupcast Communication, 3rd Generation Partnership Project (3GPP), Mobile Competence Centre, 650, Route Des Lucioles, F-06921 Sophia, vol. RAN WG1, No. Chengdu, China, Oct. 8, 2018-Oct. 12, 2018, Sep. 29, 2018, XP051518525, 4 Pages.
(Continued)

*Primary Examiner* — Marcus Smith
*Assistant Examiner* — Rowan K Fakhro
(74) *Attorney, Agent, or Firm* — ARENTFOX SCHIFF, LLP

(57) ABSTRACT

Aspects for reducing interference for transmissions in unlicensed frequency bands are disclosed. An apparatus, e.g., a user equipment (UE) with information to transmit, identifies before transmitting the information in an unlicensed frequency spectrum, a specified duration of a listen-before-talk (LBT) operation in that spectrum. Based on the specified duration, the UE reduces a transmission time duration of a slot of the UE to increase a time duration of a remainder of the slot sufficient to prevent, or decrease the likelihood of, a transmission by the UE in the slot from interfering with an LBT operation by another UE.

30 Claims, 12 Drawing Sheets

(56) References Cited

U.S. PATENT DOCUMENTS

| | | | | |
|---|---|---|---|---|
| 2019/0246431 | A1* | 8/2019 | Baghel | H04W 52/281 |
| 2020/0288498 | A1* | 9/2020 | Li | H04W 74/08 |
| 2022/0061090 | A1* | 2/2022 | Fehrenbach | H04W 72/20 |

OTHER PUBLICATIONS

Interdigital Inc., "NR Sidelink Resource Allocation Mechanism for Mode 2", 3GPP Draft, 3GPP TSG RAN WG1 #96bis, R1-1905402, NR Sidelink Resource Allocation Mechanism for Mode 2, 3rd Generation Partnership Project (3GPP), Mobile Competence Centre, 650, Route Des Lucioles, F-06921 Sophia-Antipolis CE, vol. RAN WG1, No. Xian, China, Apr. 8, 2019-Apr. 12, 2019, Apr. 3, 2019, XP051707473, 7 Pages.

International Search Report and Written Opinion—PCT/US2021/072839—ISA/EPO—May 12, 2022.

Samsung: "On Resource Allocation Mechanisms for NR V2X", 3GPP Draft, 3GPP TSG RAN WG1 #96, R1-1902276 On Resource Allocation Mechanisms for NR V2X, 3rd Generation Partnership Project (3GPP), Mobile Competence Centre, 650, Route Des Lucioles, F-06921 Sophia-Antipolis Cedex, FR, vol. RAN WG1, No. Athens, Greece, Feb. 25, 2019-Mar. 1, 2019 Feb. 15, 2019 (Feb. 15, 2019), XP051599971, 6 Pages, paragraph [2.1.2].

* cited by examiner

SLOT DURATION ADAPTATION IN UNLICENSED FREQUENCY SPECTRUM

CROSS-REFERENCE TO RELATED APPLICATION

This application is a National Phase entry of PCT Application No. PCT/US2021/072839, entitled "SLOT DURATION ADAPTATION IN UNLICENSED FRQUENCY SPECTRUM" and filed on Dec. 9, 2021, which claims priority of Greek application Ser. No. 20210100011, entitled "SLOT DURATION ADAPTATION IN UNLICENSED FRQUENCY SPECTRUM" and filed on Jan. 7, 2021, both of which are expressly incorporated by reference herein in their entirety.

BACKGROUND

Technical Field

The present disclosure relates generally to communication systems, and more particularly, to reducing interference in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure is generally directed to user equipments (UEs) or other devices communicating over one or more sidelink channels in a wireless network. The communication can be conducted in a manner that reduces, or in some cases eliminates, the possibility of a first UE's transmission being detected in a first slot by a second UE (such as in a listen-before-talk (LBT) procedure in which the second UE senses the energy of the first UE's transmission), thereby potentially causing the second UE to needlessly abort its scheduled transmission in a second slot subsequent to the first slot. In various configurations, the second UE reduces a duration of its scheduled transmission by an amount sufficient to avoid temporal overlap with the LBT or other energy sensing procedure over the sidelink channel. While the principles described herein broadly apply to transmissions and other activity by devices over the sidelink channels of a wireless network, for illustrative purposes, the principles herein are demonstrated in the context of a cellular vehicle-to-everything (C-V2X) technology. However, the concepts herein can equally be applied to other network protocols and/or other equipment over the sidelink channels, and are not limited to C-2VX protocols.

C-V2X is a diverse technology for enabling direct wireless communication between a vehicle (including a driver, passenger, etc.) and another entity related to or affected by the vehicle. Examples include communications between the vehicle and the network, pedestrians, electronic devices, grids, traffic devices (e.g., traffic lights), infrastructure, passenger communications, and the like. Among other advantages, C-V2X provides lower latency, ultra-reliable communication and a high data rate for numerous transportation-related applications, including autonomous driving. It is anticipated that C-V2X will operate at least in part in the unlicensed frequency spectrum. Current regulations require devices to perform a listen-before-talk (LBT) procedure prior to accessing the channel. An LBT operation entails sensing the channel medium by a device to verify that the channel is idle for a specified time before the device transmits information over the channel. A channel may be deemed idle by the LBT operation if no signal energy (or signal energy below some threshold) is detected over a certain sensing time interval.

While C-V2X currently has no provision for operating in the unlicensed spectrum, C-V2X is a synchronous system in that transmissions are aligned with slots. As such, the C-V2X device should perform an LBT procedure prior to a target slot for transmission to ensure that the transmission by the device does not interfere with an unrelated ongoing transmission, such as, for example, a Wi-Fi signal transmission in the same unlicensed spectrum. If no such energy is detected, then the C-V2X device can proceed to transmit in the next slot. The LBT sensing interval corresponds to the last part of the slot preceding the target slot, such that if the device senses an idle channel the device can proceed to transmit data in the next available (i.e., target) slot. A disadvantage of this approach is that the LBT operation of the C-V2X device may detect energy originating from an existing transmission by another C-V2X device and unnecessarily cancel a subsequent transmission intended for the next slot. More often than not, however, the C-V2X devices do not require more than one slot to transmit. In this case, then, the C-V2X device that detected the interference will defer transmitting on the next slot even though the next slot is likely available. The inevitable result of this pattern of an LBT overlapping with an active C-V2X transmission in the same slot is increased latency and decreased overall throughput. It is noted that, for simplicity, the LBT sensing procedure and corresponding channel state (idle or busy) identification may be referred to herein, where appropriate in the context, collectively as "LBT", e.g., as in the preceding sentence. As C-V2X transmissions in a given region over the unlicensed spectrum occur more often, this pattern of delay is only exacerbated, and can result in in a cumulative degradation of C-V2X performance.

To address this problem, C-V2X devices in the unlicensed spectrum can be configured to perform LBT operations that sense interference from non-C-V2X sources (e.g., Wi-Fi activity and other wireless sources) but avoid detecting interference originating from C-V2X activity since, as identified above, average single-slot transmission duration of C-V2X devices obviates the need and utility of canceling scheduled C-V2X transmissions in a subsequent slot in that case. In one such configuration, a C-V2X source such as a user equipment (UE) that has information to transmit identifies a maximum specified duration of a listen-before-talk (LBT) operation. Based on that duration, the UE reduces a transmission time duration of a slot, e.g., by substituting symbols used for data transmission in the original slot transmission configuration with null symbols at the end of the slot, sufficient to prevent a transmission by the UE in the slot from getting detected by the LBT operation by another UE. By ensuring that the transmitted slot's duration is shorter than the maximum LBT duration accorded any other C-V2X device, C-V2X interference for single-slot transmissions can be avoided.

Shortening the slot duration naturally reduces the resources that a UE can utilize for data transmission over the channel using that slot. Accordingly, in another configuration, the slot duration is shortened by an amount sufficient to reduce, but not altogether eliminate, a probability of overlap with LBTs. Deferred transmissions can occur, for example, when a UE uses a longer-than-average LBT to sense the channel during a contemporaneous C-V2X transmission in the slot. A compromise can beneficially be made to determine a reduced slot duration that optimizes respective transmission and LBT durations that maximize overall network throughput.

In an aspect of the disclosure, a method, a computer-readable medium, and an apparatus are provided. The apparatus includes a memory, and at least one processor coupled to the memory and configured to identify, before transmitting information in an unlicensed frequency spectrum, a duration of a listen-before-talk (LBT) operation, and to reduce a transmission time duration of a slot of the UE to increase a time duration of a remainder of the slot sufficient to prevent a transmission by the UE in the slot from interfering with an LBT operation by another UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
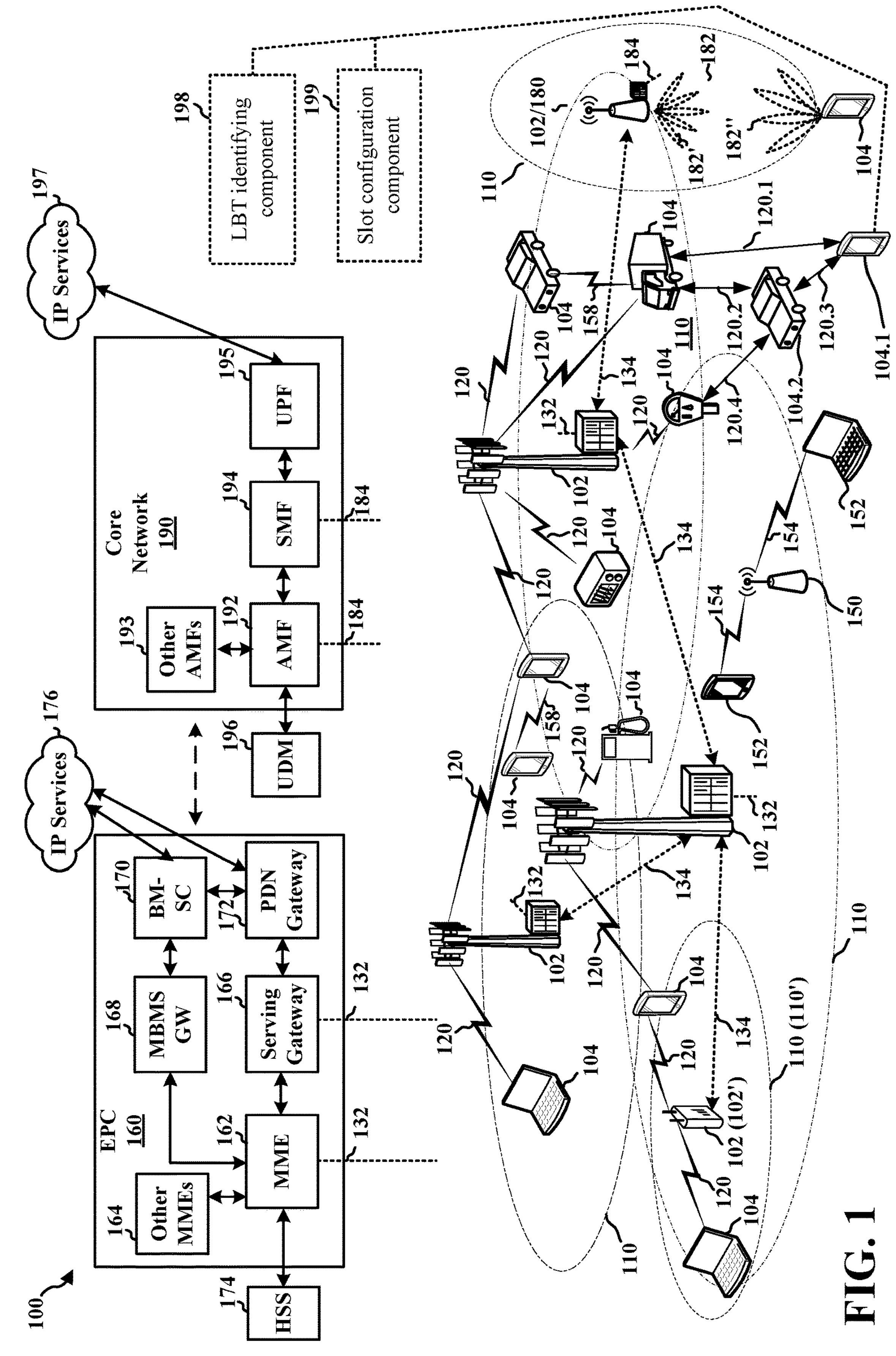
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The present disclosure is directed to optimizing communications across one or more channels in an unlicensed spectrum. C-V2X is considered in one illustrative example. C-V2X is a robust technology that enables network independent communication. Examples of C-V2X communication techniques include low latency vehicle to vehicle (V2V), vehicle to infrastructure (V2I), vehicle to person (V2P), and others. While the concepts of the disclosure are presented in the context of C-V2X, it should be understood that the principles herein can be equally applicable to other wireless communication technologies and other standards defining the frameworks for these technologies.

Because UEs in C-V2X can operate in unlicensed spectra, it is generally important to attempt to minimize potential collisions with transmissions from other communication sources operating in the proximity of the UEs. Examples include wireless Wi-Fi technologies as described in IEEE 802.11a, b, e, n and other sections. To anticipate and avoid such potential collisions, it would be desirable for each the UEs in the C-V2X network to use LBT operations that sense energy on the medium for a specified duration. The LBT operation may be performed at or near the end of a slot prior to the target slot for transmission.

For these reasons, the collision avoidance mechanism for C-V2X should be implemented in a manner that avoids needless overlap with itself. That is, in one aspect of the disclosure, the LBT operation should be positioned at the end of the slot immediately prior to the anticipated slot for transmission. The transmitting UE may identify a specified duration of time used by other devices in the C-V2X network for LBT operations. The time may, for example, be a maximum possible time of an LBT based on the sub-carrier spacing numerology, the channel priority, or other factors as described/indicated in specifications and/or by regulation. Based on the specified duration, the UE may decrease a duration of its slot length for transmitting information in a manner that prevents overlap of its slot with an LBT of another UE in the C-V2X network. To reduce the slot length, for example, the UE may replace one or more symbols at the end of the slot with null symbols (i.e., symbols where no transmission is performed). In this manner, communications across the different channels (e.g., physical sidelink feedback channel (PSFCH), physical sidelink shared channel (PSSCH), physical sidelink control channel (PSCCH), etc.) can proceed with a much lower likelihood of interference between C-V2X devices, with C-V2X transmissions being deferred only for other wireless sources of transmission such as Wi-Fi.

In some configurations, to avoid an aggressive reduction of the resources for data transmission in a slot and hence C-V2X per-slot data capacity, it may be desirable to decrease the slot length by an amount less than the maximum possible LBT duration. For example, the duration of a typical (e.g., average) LBT operation may be chosen. In these embodiments, the lesser number of nulled symbols at the end of a slot creates a non-zero probability of an LBT detecting C-V2X activity and consequently rescheduling its transmission. More generally, in cases where using a maximum LBT operation as the meter for reducing slot configuration results in less than desired throughput, a compromise can be made by reducing the slot duration by some lesser amount. To this end, the UE can effectively self-optimize its network performance by selecting a slot length that optimizes the channel configuration. That is to say, the UE can address the competing considerations of ensuring a long enough slot length to maximize its data capacity, but short enough to preserve a sufficiently low probability that the LBT from other C-V2X devices will detect the transmission.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR. D2D communication link 158 may also be used for C-V2X communications.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104.1 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The lower right portion of FIG. 1 illustrates a D2D or sidelink network, such as a separate C-V2X network. UE 104.1 can communicate with truck 104 using a sidelink channel 120.1 (e.g., PSSCH). In this example, the UE 104 may or may not be connected to the network via a base station 102/180. Other devices may also be connected to the simplified C-V2X network as shown. For example, UE 104.1 may be communicating with vehicle 104.2 using sidelink channel 120.3. Vehicle 104.2 may be communicating with truck 104 over a separate sidelink channel 120.2. Vehicle 104.3 may also be transmitting payment information, for example, to meter 104 via sidelink 120.4. Each of the devices in this example are (or include) UEs. Truck 104 may, in turn, be coupled to D2D channel 158 as described above, to form another sidelink channel.

Referring again to FIG. 1, in certain aspects, the UE 104 may be configured to include LBT identifying component 198 and slot configuration component 199. LBT identifying component 198 may in various implementations be configured to identify, from a base station or another UE, or through an input or manually updated software program, a duration of an LBT intended for use in the C-V2X network. Slot configuration component 199 may be operable to adjust a duration of a slot for use in an unlicensed spectrum based on an LBT duration identified by component 198, or using other criteria such as an optimization algorithm. For example, component 199 may replace OFDM symbols at an end of the slot configuration with null symbols to effectively reduce the slot length. Component 199 can, in turn, prevent or reduce the possibility of overlaps between data transmissions and LBTs in the C-V2X network.

Although the following description may be focused on C-V2X network, the concepts described herein may be equally applicable to other similar areas, such as other peer-to-peer networks in which collisions may be present or in which a need exist to reduce collisions. Further, although the following description may be focused on 5G NR, the concepts described herein may also be applicable to other similar areas, such as LTE, LTE-A, CDMA, GSM, and other wireless technologies.

Figure 2A:
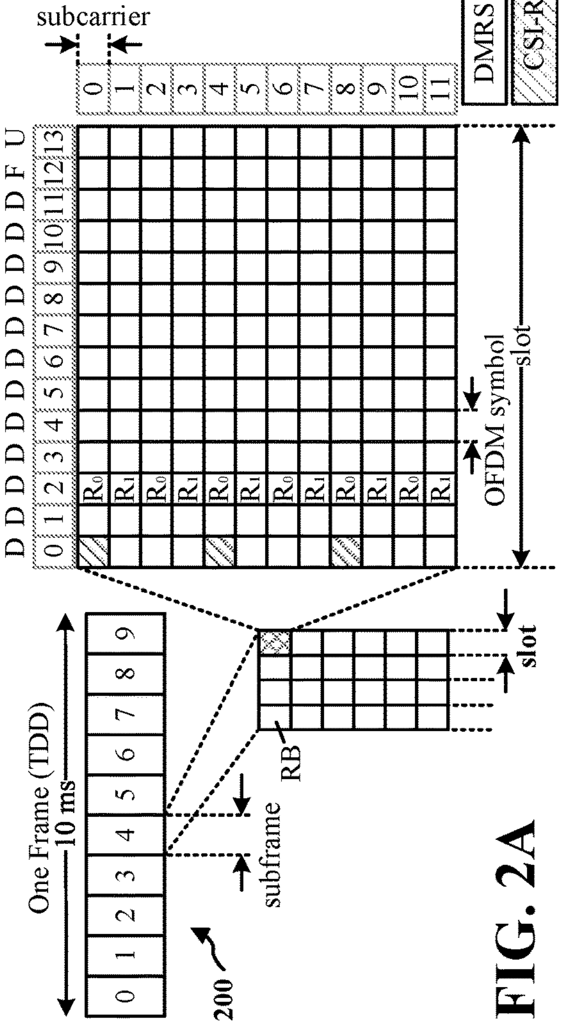
FIG. 2A is a diagram illustrating an example of a first frame, in accordance with various aspects of the present disclosure.
Figure 2B:
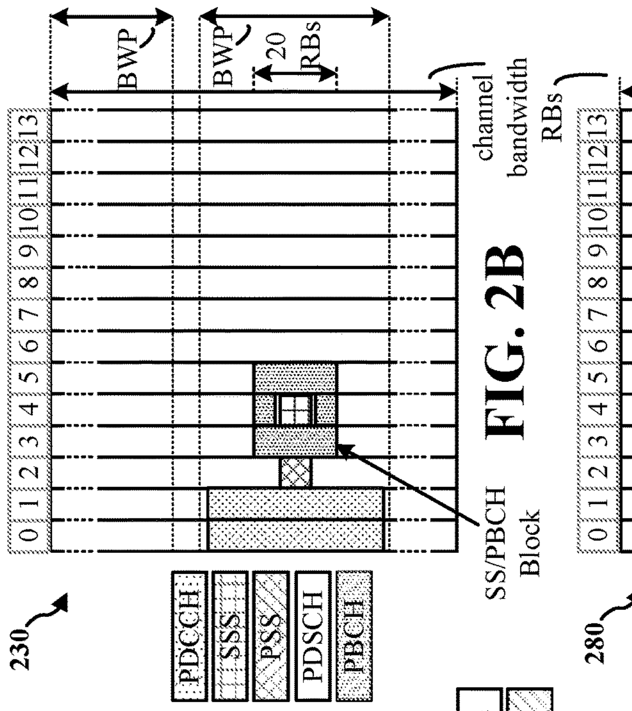
FIG. 2B is a diagram illustrating an example of DL channels within a subframe, in accordance with various aspects of the present disclosure.
Figure 2C:
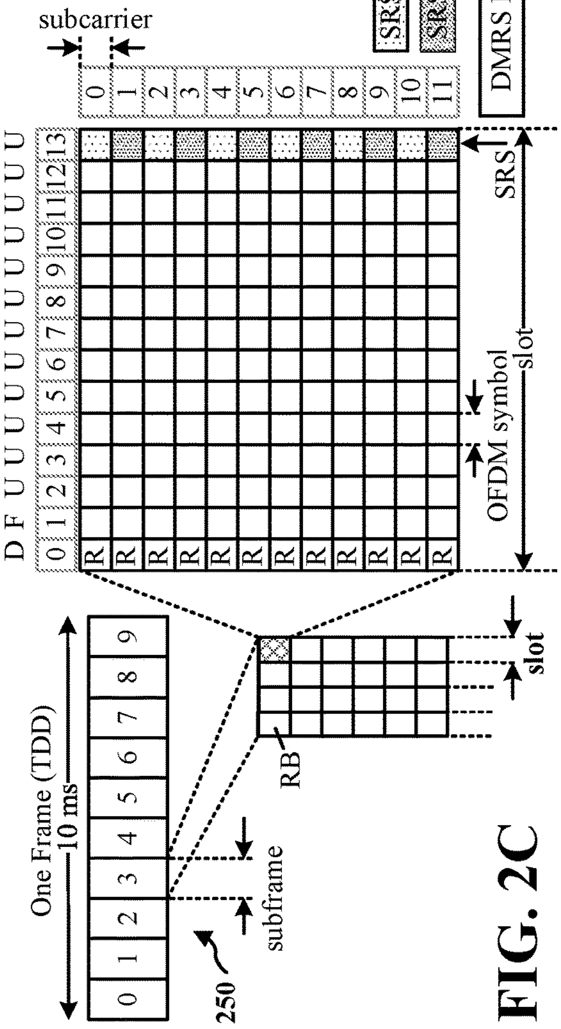
FIG. 2C is a diagram illustrating an example of a second frame, in accordance with various aspects of the present disclosure.
Figure 2D:
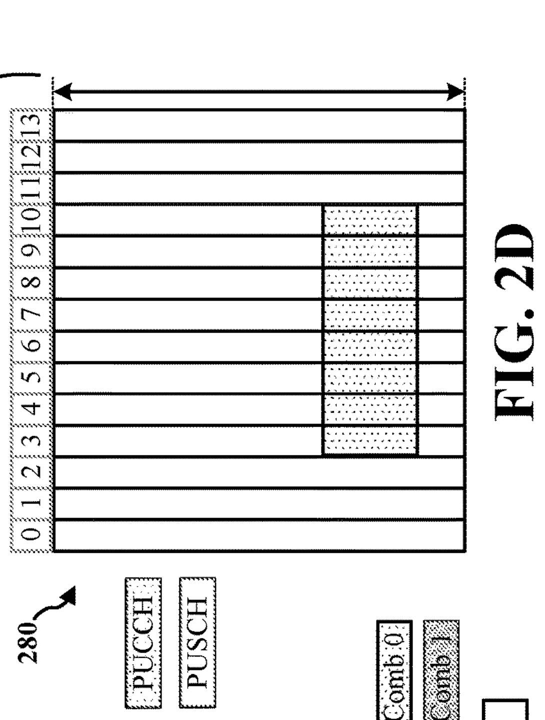
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu=0$ to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}\cdot 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
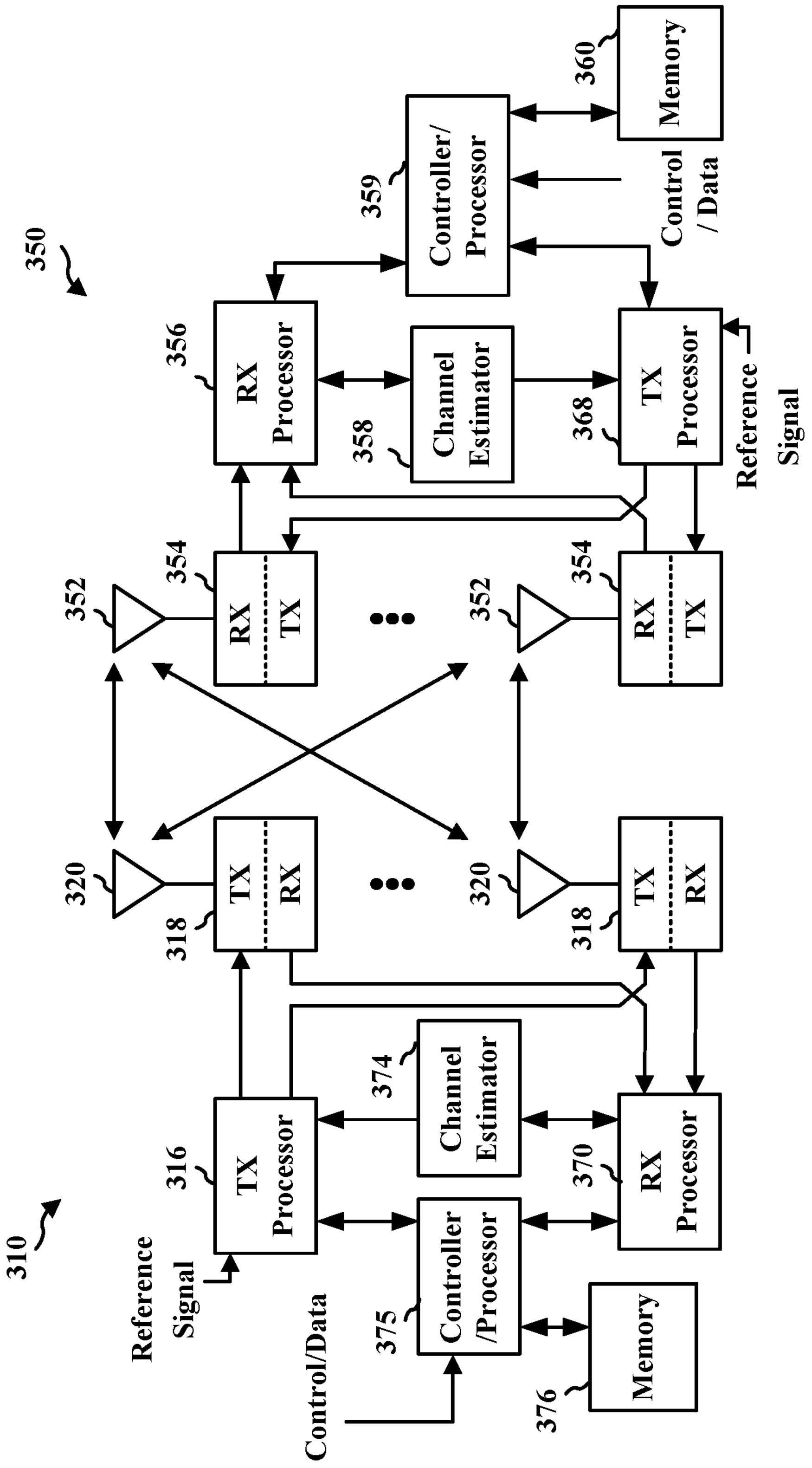
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TB s, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with components 198 and 199 of the UE 104 as illustrated in FIG. 1.

Various implementations of the C-V2X and related networks will now be described in greater detail. C-V2X can provide lower latency, ultra-reliable communication and a high data rate for enabling a slew of applications including autonomous driving. An important aspect of C-V3X is its operation in unlicensed frequency bands. Because these bands may be arbitrarily accessed and used by other network resources, an LBT procedure should be applied by a UE prior to accessing the channel. Operation in the unlicensed band (or spectrum) is typically regulated, and the LBT procedure is more often than not a requirement prior to accessing the channel. To this end, the UE may sense the channel medium for energy indicative of a transmission. If the UE senses that the channel medium is idle for specified duration or amount of time, the UE can proceed to transmit data, including control information, AGC symbols, etc. While Release 16 of 3GPP (NR-V2X) is being developed to support the networks described herein, no provision exists in Release 16 at this point for operation in the unlicensed band or for LBT operations.

As noted above, NR C-V2X is a synchronous system in the sense that transmissions are aligned with slots. An LBT procedure corresponding to an anticipated transmission over a target slot may be performed during the slot prior to the target slot.

Figure 4:
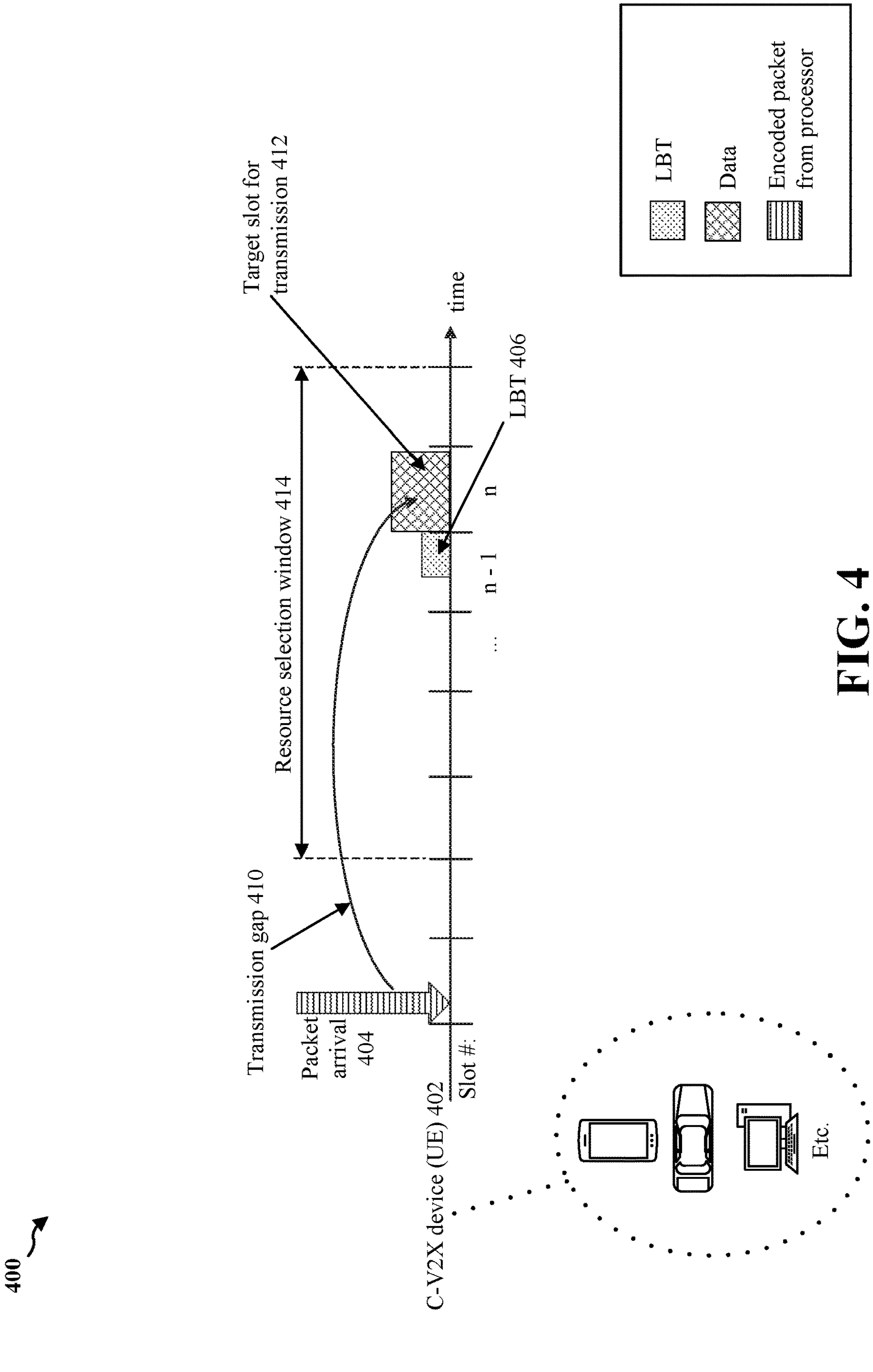
FIG. 4 is a timing diagram of a UE scheduling a transmission over a sidelink channel.

FIG. 4 is a timing diagram 400 of a UE scheduling a transmission over a sidelink channel. The UE in the example shown may be a UE or C-V2X device 402 (that is, a device using a C-V2X network), such as any of the devices shown in the figure, or a UE integrated with or coupled to infrastructure-based equipment (e.g., a traffic light, parking meter, autonomous driving controller, etc.). The steps in FIG. 4 can be performed, for example, by any of the UEs 104, 104.1, 104.2 of FIG. 1 (including components 198 and 199), UE 350 of FIG. 3, UEs 402 of FIG. 4, and apparatus 1200 of FIG. 12. A packet generated at a processor arrives at a transceiver or at a designated memory location for use by a transmit controller (404). The packet arrival may refer to the passing of the packet, e.g., from a baseband cellular processor or processors to a transceiver or other circuit such that the encoded, modulated packet is ready to transmit. The transmission gap 410 may be selected by one or more processors based on a suitable algorithm. How early prior to the start of the target slot the LBT procedure can be initiated depends on, potentially among other factors, the minimum sensing duration required to declare the channel at issue as idle. For example, if the applicable specification or regulation mandates that the channel must be sensed as idle for at least 100 micro-seconds (μS) (not necessarily contiguous), it follows that the LBT operation should be initiated at least 100 μS prior to the beginning of the target slot.

The UE 402 can initiate an LBT operation 406 to sense the channel in the unlicensed spectrum prior to the start of the target slot n (412). If the UE 402 does not sense energy indicative of an interfering transmission (e.g., an ongoing Wi-Fi transmission), the UE 402 can proceed to transmit in slot n. Thus, transmission (412) only proceeds over slot n if the UE 402 senses through the LBT operation that the channel is idle during the LBT period prior to the beginning of the target slot 412 n.

While no specifications are currently available governing the LBT duration for a C-V2X transmission, the current NR-U (new radio unlicensed) specifications provide a potential guideline. As an example, in NR-U, a category-4 LBT that can provide a channel occupancy time (COT) of 4 ms requires that the UE identify the channel as idle for at most 169 μS. The 169 μS is used herein as a maximum specified LBT duration purely for illustrative purposes; in practice, the specified duration can vary without departing from the principles of the disclosure.

Using the exemplary 169 μS sensing interval from the NR-U LBT specifications, 169 μS provides a channel occupancy time (COT) that spans 4, 8, or more slots, depending on the sub-carrier spacing (SCS) numerology (15 KHz/30 KHz/etc.). A COT of four (4) (consecutive) slots is sufficient to support the vast majority of traffic patterns expected in CV2X applications. When a UE targets a particular slot for transmission, the corresponding LBT operation may be positioned to occur in the prior slot as noted above (e.g., starting 169 μsecs prior the start of slot n). Thus for example, in slot n−1 of FIG. 4, the LBT operation can be limited to take place within a latter portion of the slot n−1, after the beginning of the slot and up to the end of the slot.

In the context of an unlicensed frequency band, applying the LBT operation in the latter portion of a slot prior to the target slot helps protect the UE from transmitting signals that may interfere with other ongoing wireless transmissions in the vicinity. For example, energy detected by the LBT operation, if any, may correspond to Wi-Fi transmissions. Notably, if activity detected in the prior slot is due to Wi-Fi transmissions, the activity is likely to persist across the target slot. The UE's use of the LBT to conclude that the channel is busy and to abort the C-V2X transmission is beneficial in that it both avoids a collision and preserves the integrity of the existing Wi-Fi transmission.

Figure 5:
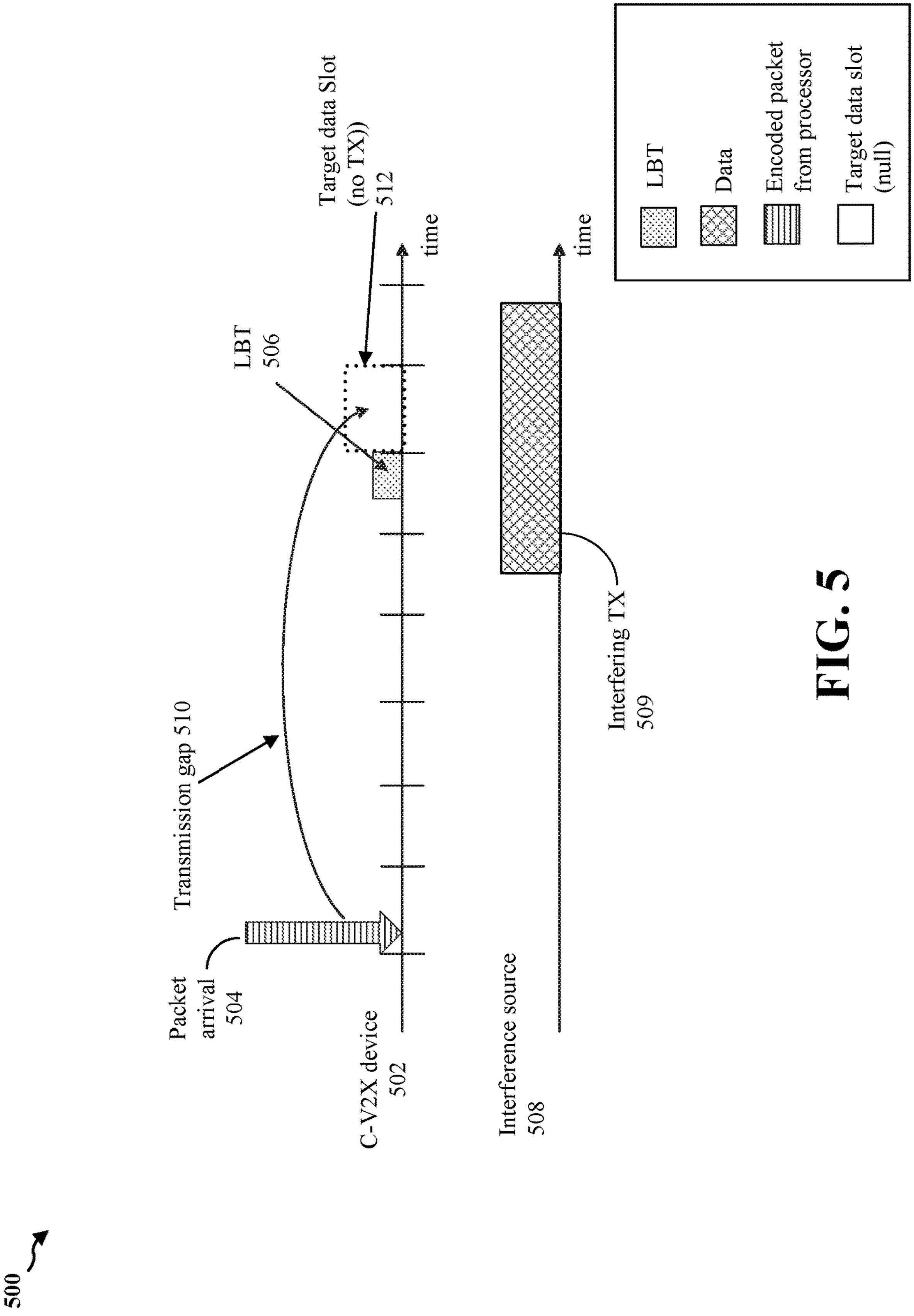
FIG. 5 is a timing diagram illustrating a UE canceling a scheduled transmission over a sidelink channel upon detecting an interfering transmission from another source.

FIG. 5 is a timing diagram 500 illustrating a C-V2X device 502 canceling a scheduled transmission over a sidelink channel in an unlicensed band upon detecting an interfering transmission from another source 508, which may be a Wi-Fi transceiver. The steps in FIG. 5 can be performed, for example, by any of the UEs 104, 104.1, 104.2 of FIG. 1, UE 350 of FIG. 3, UEs 402 of FIG. 4, and apparatus 1200 of FIG. 12. As before, when a packet prepared by the UE's baseband processing system arrives (504) in a memory location ready for transmission, the UE 502 may select respective LBT and target transmission slots 506 and 512. Upon initiating the LBT operation 506, the UE can sense the interfering Wi-Fi transmission 509 and accordingly can abort the data transmission. The UE can thereafter reschedule the transmission, and a collision that may otherwise cause both transmissions to fail is averted.

The nature of the LBT sensing activity is such that it does not discriminate among different types of signals. Rather, the UE only measures energy levels of the channel and responds if some threshold energy level is detected. For this reason, the LBT may detect activity that was in fact generated by another C-V2X device transmitting over the same slot coincident with the LBT operation.

Figure 6:
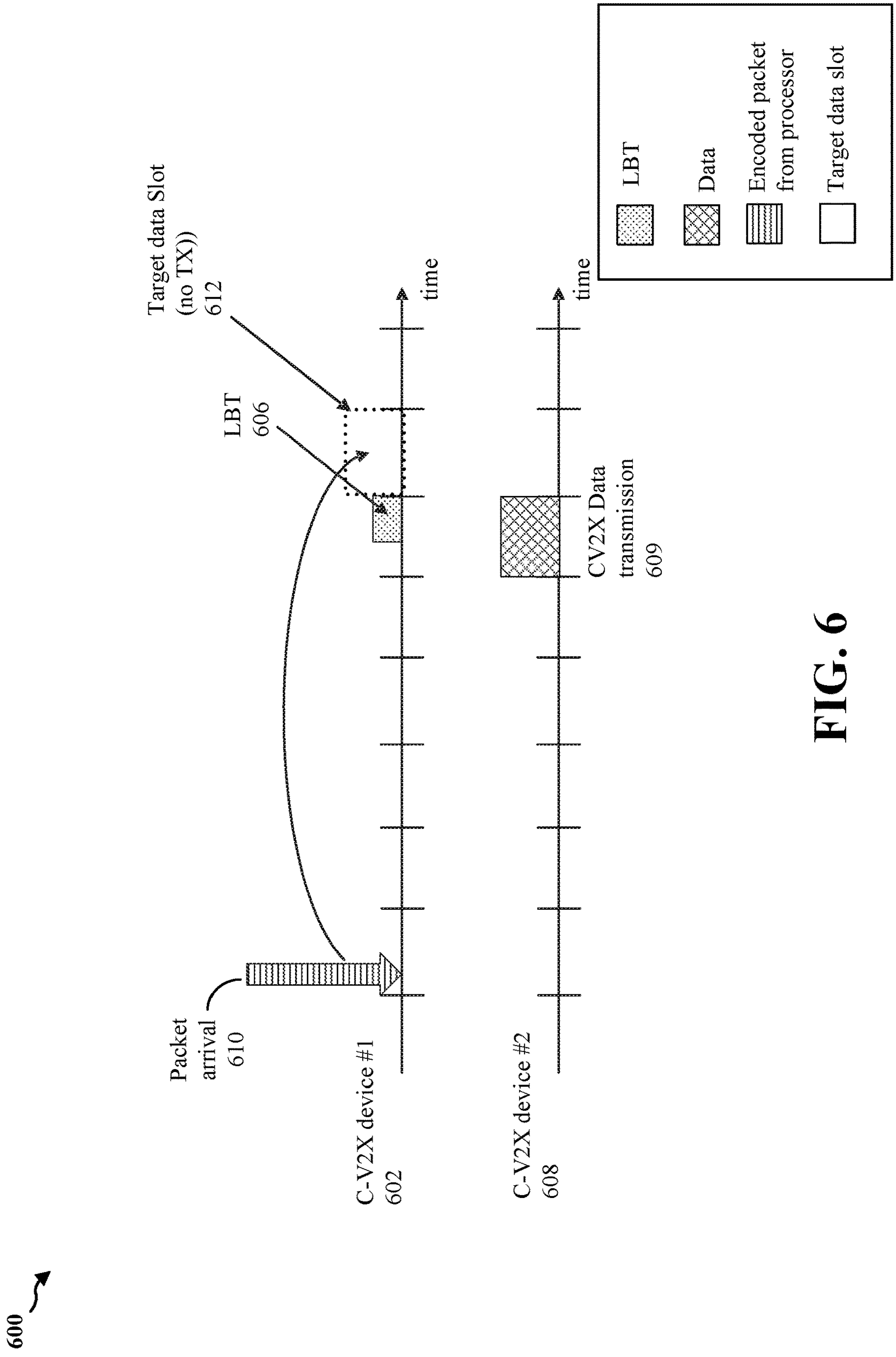
FIG. 6 is a timing diagram illustrating a UE canceling a scheduled transmission over a sidelink channel upon detecting an interfering transmission from another UE.

To this end, FIG. 6 is a timing diagram 600 illustrating a UE, e.g., C-V2X device 602 that cancels a scheduled transmission over a sidelink channel upon detecting a C-V2X data transmission from another UE, e.g., C-V2X device 608. The steps in FIG. 6 can be performed, for example, by any of the UEs 104, 104.1, 104.2 of FIG. 1, UE 350 of FIG. 3, UEs 402 of FIG. 4, and apparatus 1200 of FIG. 12. As before, an encoded packet 610 ready for transmission may trigger the C-V2X device 602 to identify LBT and target slots. Also as before, device 602 initiates an LBT operation in the slot preceding the target slot. In this example, the LBT slot coincides with the target slot in use by device 608, in which device 608 is transmitting data over the slot 609. Device 602 aborts the transmission as a result.

Aborting transmission due to C-V2X activity, however, provides no tangible benefits at least because as noted above, the probability of a C-V2X transmission occupying two consecutive slots is very small. Thus, aborting the transmission by the device 602 in target slot 612 causes device 602 to miss a transmission opportunity otherwise available over the sidelink channel, resulting in channel latencies and lowered throughput. Even if the detected C-V2X activity in slot 609 were to continue into the target slot, the procedures described in Release 16 are designed to ameliorate the possibility of collision between the two transmissions for additional reasons. Thus, the overlap of the LBT 606 and the C-V2X transmission is undesirable.

In one aspect of the disclosure, the UE's C-V2X slot structure can be modified such that the probability of a collision based on an LBT sensing the C-V2X transmission is zero, or sufficiently small. C-V2X transmissions are commonly conducted such that they terminate earlier within their designated slots. This early termination effectively leaves a gap over the last part of the slot in which other UEs may be permitted to schedule LBT operations. Thus if the present C-V2X transmission ends early, the channel can become available and the completed transmission in the slot in question does not affect the presence of other LBTs that are positioned at the latter portion of the same slot.

For example, in sidelink activity within a licensed frequency band, the last OFDM symbol of the slot may include a single gap symbol to allow the UE sufficient time for switching to a receive mode for the next slot, or vice versa. In accordance with aspects of this disclosure, the gap duration of null symbols (no transmissions) at the end of a slot configuration in the unlicensed frequency band may be increased as necessary under the operational conditions as described below.

Figure 7:
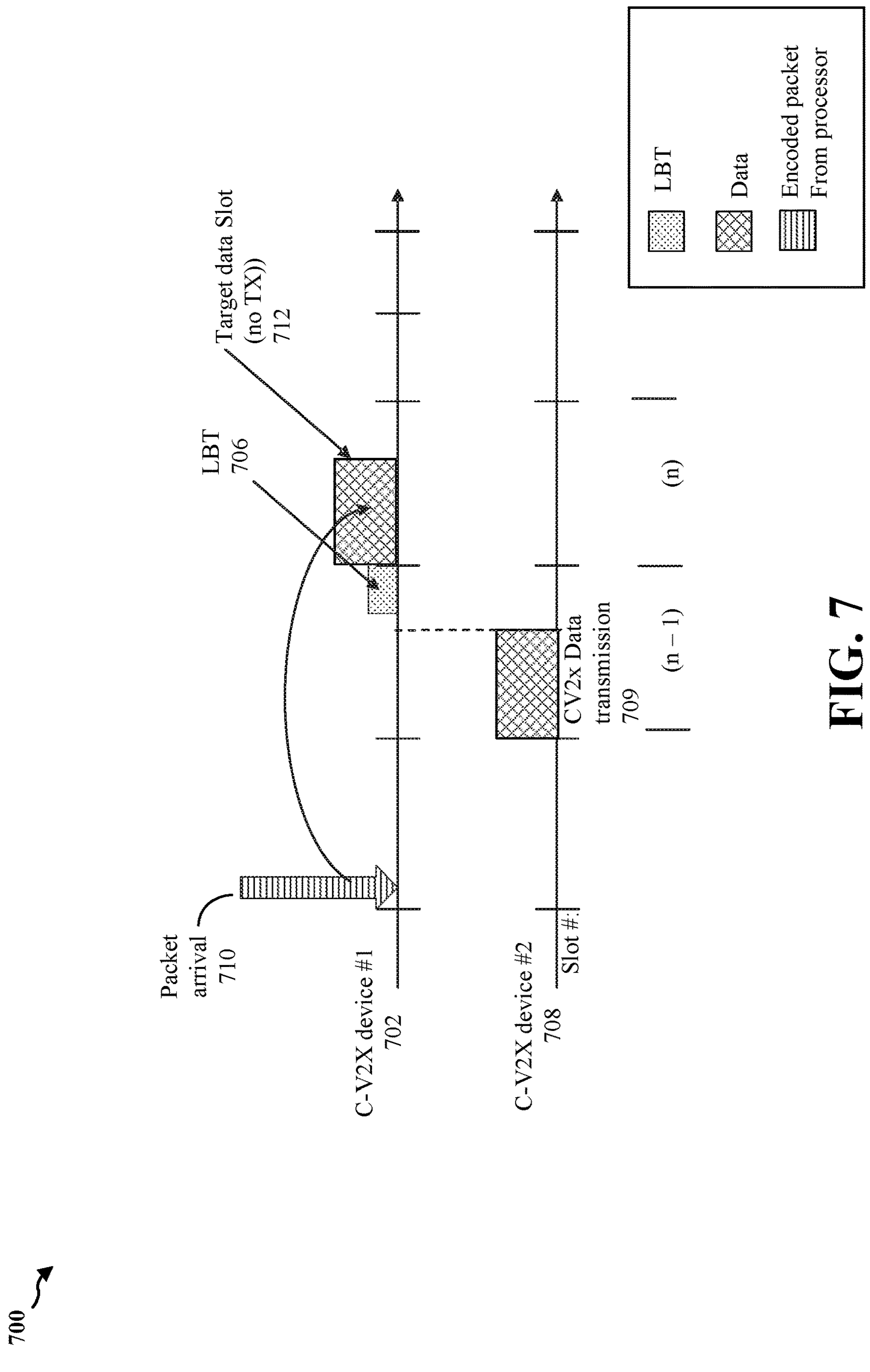
FIG. 7 is a timing diagram of a UE transmitting information while avoiding interfering with an LBT procedure and transmission of another UE over a sidelink channel.

FIG. 7 is a timing diagram 700 of a UE transmitting information while avoiding interfering with an LBT procedure and transmission of another UE over a sidelink channel. Two UEs or C-V2X devices 702 and 708 are illustrated. The steps in FIG. 7 can be performed, for example, by any of the UEs 104, 104.1, 104.2 of FIG. 1, UE 350 of FIG. 3, UEs 402 of FIG. 4, and apparatus 1200 of FIG. 12. As per earlier configurations, when device 702 has a packet ready for transmission (702), device 702 establishes respective slots n−1 and n for performing an LBT operation 706 in slot n−1 and for transmitting the data in the target slot n (712). Meanwhile, device 708, having previously performed an LBT (not shown), transmits data in slot 709 (n−1). In accordance with aspects of the disclosure, this transmission 709 is configured to terminate earlier than the beginning of the LBT by device 702 in the latter portion of slot n−1. In this example, the (category 4) LBT duration is randomly selected, ranging between a shortest and longest value. Thus the transmission termination time of slot 709 is adjusted to account for the longest LBT duration under the circumstances. Accordingly, because no CV2X activity is detected during the LBT energy sensing interval n−1 for device 708, the transmission 712 by C-V2X device 702 proceeds over slot #n (712) as originally scheduled. In like manner, device 702 terminates its own transmission 712 sufficiently early to account for the possibility that another UE will transmit a maximum duration in the latter part of slot n. Thus, any C-V2X overlapping activity is avoided, which results in reduced latency and better use of the sidelink resources.

The actual maximum duration of the LBT depends on factors such as the sub-carrier spacing numerology. In general, the aspects of the present disclosure are broadly applicable to any such numerology, with the slot and LBT durations varying as a function of the numerology. Thus, the principles herein may be applicable to numerologies 0-3, for example, which respectively describe SCS 15, 30, 60 and 120 KHz with 1, 2 4 and 8 slots per subframe. As an example of one configuration, a 30 KHz SCS numerology is considered. For this numerology, an OFDM symbol duration based on a typical cyclic prefix (CP) duration may be approximately 35.677 μS. The last OFDM symbols of the slot that may potentially overlap with the LBT sensing interval of another device can be replaced with null symbols, meaning that no energy is transmitted within these symbols.

Figure 8:
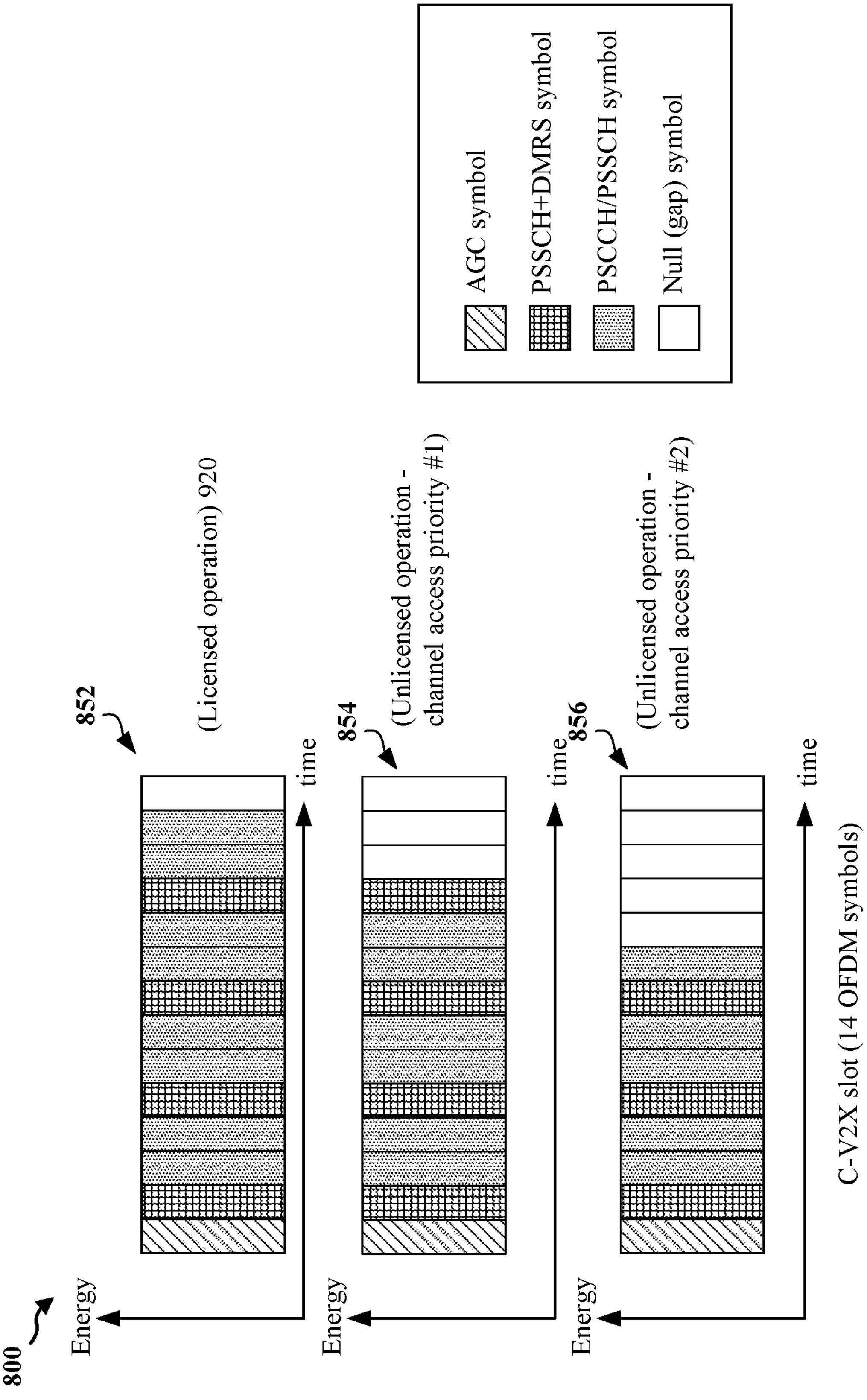
FIG. 8 is a diagram of different C-V2X slot configurations.

FIG. 8 is a diagram 800 of different C-V2X slot configurations for the PSSCH and PSCCH C-V2X slot structures. The slot configurations of FIG. 8 can be used, for example, by any of the UEs 104, 104.1, 104.2 of FIG. 1, UE 350 of FIG. 3, UEs 402 of FIG. 4, and apparatus 1200 of FIG. 12. Each of the C-V2X slots for purposes of this example is fourteen (14) symbols in length. As shown by the legend in the lower right portion of the figure, the slots represent different symbols in the PSSCH and PSSCCH channels, and they include AGC, DMRS and null symbols. The first diagram 852 illustrates a slot configuration for a licensed operation 920. Only one symbol is null at the end to provide the device with enough time to switch between modes, from receiving to transmitting mode or vice versa. Slot configuration 854 describes a slot in an unlicensed operation with a channel priority of 1 as defined in the NR-U specification. In those circumstances, a COT lasts two (2) ms. The LBT duration may be as large as 90 μS in this case. This means that the last three OFDM symbols of the slot (35.7×3) may be replaced with null symbols to ensure that there is no overlap between LBT sensing and C-V2X activity over a channel. In another slot configuration 856 for an unlicensed operation where the channel access priority is 2 as defined in the NR-U specification, which provides a COT of 4 ms, the LBT duration may be as large as 169 μS in this case. Thus the last 5 OFDM symbols in the slot may be null to ensure no overlap with other C-V2X transmissions in that case.

As noted from the above examples, while the collision probability is reduced or eliminated, the number of resources for PSCCH and PSSCH data (TB) transmission is also reduced. This reduction can be managed by the rate-matching operation. In addition, it should be noted that in the unlicensed examples, the illustrated slot structure represents a reduced version of symbols that are otherwise in the same order as the licensed operation. However, this order of operation is for exemplary purposes only, and another order or number of particular symbol types may be replaced as is most efficient to transmit the information for a given channel under the circumstances. Thus, for example, a greater or fewer number of PSSCH and PSCCH symbols may be used in a reduced slot configuration as long as the necessary number of symbols at the end are nullified to accommodate the worst case LBT duration.

Figure 9:
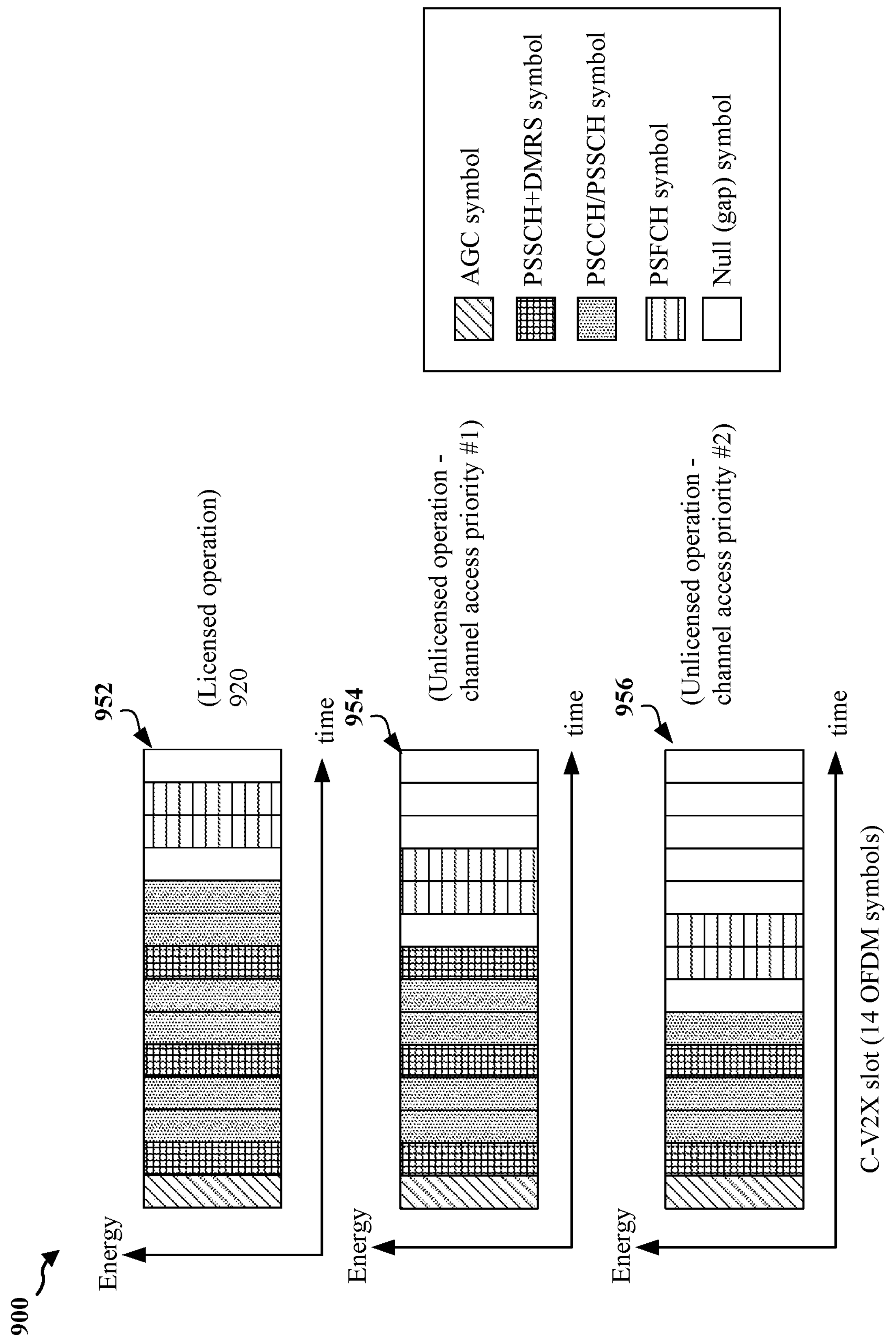
FIG. 9 is another diagram of different C-V2X slot configurations.

FIG. 9 is another diagram 900 of different C-V2X slot configurations based on the use of PSSCH, PSCCH and PSFCH channels. The slot configurations in FIG. 9 can be used, for example, by any of the UEs 104, 104.1, 104.2 of FIG. 1, UE 350 of FIG. 3, UEs 402 of FIG. 4, and apparatus 1200 of FIG. 12. All three channel configurations begin with an automatic gain control (AGC) symbol as shown. Thereafter, in the slot configuration 952 having the licensed operation slot configuration 920, for example, the AGC symbol is followed by a PSSCH with a demodulation reference symbol (DMRS), then by two PSCCH/PSSCH symbols, a second PSSCH with DMRS, two more PSCCH/PSSCH symbols, a null symbol, two PSFCH symbols, and a final null symbol. The next slot configuration 954 is a similar unlicensed operation using channel access priority number 1 and, as before, uses three null OFDM symbols at its end. The third slot configuration 956 is an unlicensed operation using channel access priority number 2, and has five null symbols to accommodate maximum length LBT operations of other devices. As before, other configurations of the symbols may be possible, and the slot configurations shown are for example purposes only.

It should be noted that, because the transmission over the PSFCH channel is sequence-based, there is generally no possibility to compress the channel. Thus as shown, the PSFCH symbols generally have to be shifted towards the beginning of the slot in lieu of PSSCH symbols.

It should also be understood that, while the above examples are given with respect to C-V2X devices using PSSCH, PSCCH and PSFCH channels, the principles of the disclosure can also be extended to other network technologies across different channel types with distinct access priorities. Other network technologies, channel and slot configurations may also be possible without departing from the scope of this disclosure.

The configurations described above ensure that no-CV2X activity is detected regardless of the duration of the LBT operations up to their respective maximum lengths. As noted, this result can be configured to remain true for whatever particular numerology is in place and whatever channel access priority may be considered. In some situations, the reductions in allocated symbols for data may introduce an excessive cost in terms of resources remaining for the PSSCH transmission. Thus, for example, if a UE has a significant amount of data to transmit over a PSSCH, for example, it may have to use more than one slot to do so.

As such, in another aspect of the disclosure, a compromise is made by reducing the number of nulled OFDM symbols in the applicable slot as before, but in this case the processor(s) may take one or more criteria into account to avoid using the maximum LBT duration as the operative duration for applying the corresponding nulled symbols. For example, one or more criteria may be taken into account in determining whether to set the number of null symbols to cover a maximum specified LBT duration under the circumstances. One such criterion is whether a frequency of Wi-Fi-based transmissions in a proximity of the UE is at or below some threshold that may be specified (i.e., whether it "meets" that threshold). Meeting this threshold for this criterion simply correlates to the fact that if Wi-Fi activity is sufficiently small to non-existent, then the probability of Wi-Fi triggering the LBT is also small. Thus the need for reducing the slot duration may lessen accordingly.

Another value of the aspects described above is to prevent overlap between different C-V2X transmissions particularly where C-V2X activity is high. Thus, another criterion relevant to determining whether a maximum LBT duration is to be used is whether C-V2X activity in the proximity of the UE is sufficiently high. For example, another threshold may be specified that relates to an extent or amount of C-V2X activity in the proximity of the UE. The criterion may, for example, include a number of detected C-V2X transmissions over a given time period, or some other measure of relative C-V2X activity. It can be determined whether an amount of C-V2X activity is at or exceeds the specified threshold (i.e., whether the C-V2X activity "meets" the threshold). In one implementation, if at least one of the two criteria meets the threshold (e.g., the amount of identified Wi-Fi activity is at or below one threshold, or the amount of identified C-V2X activity is at or above another threshold), it may be desirable to use the maximum LBT duration to avoid C-V2X overlap or avoid Wi-Fi collisions, or both. In other embodiments, the LBT duration may be adjusted upwards or downwards incrementally depending on the extent of Wi-Fi or C-V2X activity relative to the thresholds, or a lack thereof. It should also be noted that the principles disclosed herein can apply with equal effectiveness to other interfering sources, thereby protecting the C-V2X signal from transmitting when interference happens to be high in a few consecutive slots.

In some implementations, when neither the Wi-Fi activity nor the C-V2X activity meet their respective thresholds, the reduced slot duration necessitated by the maximum LBT duration may negatively impact performance more than avoided collisions benefit performance. As such, in another aspect of the disclosure, when the Wi-Fi and LBT-based criteria do not meet their respective thresholds, the UE may optionally disable the slot-reduction mechanisms and revert to default operation. In other aspects of the disclosure where the two criteria are not met, the UE can elect to use a reduced slot configuration, but without using the maximum LBT duration. In short, a compromise can be made by measuring or otherwise identifying the relative Wi-Fi and C-V2X activity (or by obtaining the information, e.g., via the network through a base station), and modifying the total reduction to the slot based on not merely the LBT duration, but also the measured or identified information. In still other aspects, an "average" LBT duration may be computed and used as a basis for decreasing slot length.

As an example, where one or both of the Wi-Fi and C-V2X-based criteria meet their respective thresholds, the UE may elect to reduce the slot configuration using the maximum LBT duration as described above. By contrast, where neither criteria meet their respective thresholds, in one arrangement the reduced slot configuration can be removed. In this case, the sidelink communications (e.g., using PSSCH) operate using a slot configuration such as 852 or 952—namely, without any reduction. In another arrangement where neither criteria meet the respective thresholds, the UE can implement adaptive enablement of the reduced C-V2X duration by reducing the slot size by some amount, but not by the maximum LBT duration. In some cases, each UE may run an algorithm that can be individually tailored to the location of the UE to to strike an optimal balance between maximizing the bandwidth of information sent on one hand, and avoiding collisions on the other hand. Each UE can use a different configuration, for example, and can provide the slot configuration, e.g., in the SCI field.

In still another configuration, the UE may perform this adaptive reduction of the slot configuration without using specific thresholds. For example, the UE can measure (or otherwise identify, e.g., from a base station) the relative perceived Wi-Fi and C-V2X activity, and based on that activity, the UE can adaptively configure the slot to be reduced anywhere from zero (0) up to the maximum amount of the LBT duration given the numerology and channel priorities at issue. In this manner, the UE can take the Wi-Fi and C-V2X activity into consideration when determining whether to reduce the slot configuration, and by what amount. In still other cases, the UE may take into account additional or different criteria when deciding the extent to which a given slot should be reduced in size.

As noted above, the UE may obtain the Wi-Fi and C-V2X activity in different ways. In one arrangement, the UE obtains the Wi-Fi and/or C-V2X activity by means of a channel busy ratio (CBR)-like measurement. For example, the UE may use this or a similar measurement to take into account decoded packets from the PSSCH. These decoded packets may provide an indication that the detected energy, or some portion thereof, corresponds to C-V2X signaling. CBR measurements may be performed independently by the different UEs involved in prospective or actual sidelink communications.

As a result of different such UEs experiencing different channel activity patterns in their proximity, different UEs may use different slot structures. In one configuration, these UEs can provide information about the slot structure being employed by using one or more bits within the sidelink control information (SCI) field. In some cases, only a single bit may be needed to convey to the recipient whether the slot configuration is normal or reduced. In other cases, the UE may opt to also convey an amount of the slot reduction in the SCI field. Because it may not be possible to indicate a change to the PSFCH slot structure, in another implementation, all networked UEs may follow the same PSFCH slot structure in which no reduced slot duration or an identical reduced duration is used.

In still another implementation, the measurements of C-V2X and/or Wi-Fi activity can be made by the network (e.g., by the gNB s and/or the RSUs). The gNB can thereupon signal the C-V2X devices using RRC or a similar messaging technique. In this implementation, PSFCH slot structures can beneficially also be adjusted according to the detected network conditions for different UEs.

More generally, the above-described aspects of the disclosure can reduce the probability of, or altogether eliminate, the unnecessary blocking of a C-V2X transmission due to C-V2X originated activity. Significant network benefits can be achieved as a result. These benefits include, for example, reduced latency (due to the ability to transmit in the initially intended slot), reduced packet drop probability (due to not being able to identify a channel as clear and, therefore, not being able to transmit a packet within a UE's packet delay budget), and substantially increased coordination among C-V2X devices. (Under the current Release 16 specification, C-V2X devices reserve future resources, and the approach herein helps the UEs honor their reservations. Otherwise, this may lead to issues that arise from a UE transmitting over a later than reserved slot (if at all) when the channel is first identified as idle). Reduced slot structures, where provided, can also reduce overhead. Further, as noted above in connection with various configurations, UEs can adaptively adjust the slot structure according to operational conditions. Thus the UE can maximize transmission efficiency dynamically, over a period of time.

Figure 10:
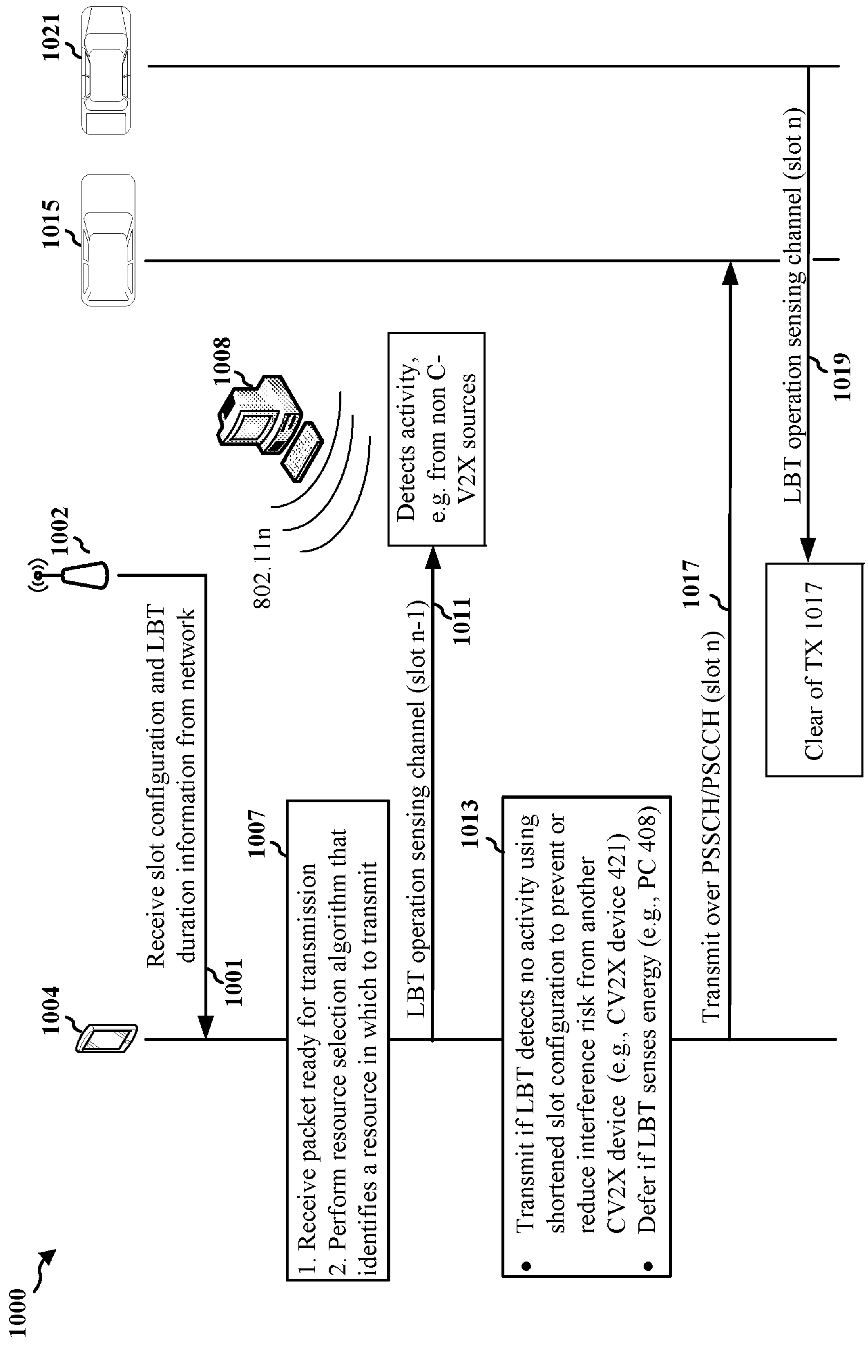
FIG. 10 is a signaling diagram of a plurality of devices in a C-V2X network.

FIG. 10 is a signaling diagram of a plurality of devices in a C-V2X network. The steps in FIG. 10 can be performed, for example, by any of the UEs 104, 104.1, 104.2 of FIG. 1, UE 350 of FIG. 3, UEs 402 of FIG. 4, and apparatus 1200 of FIG. 12. Optionally, a base station (gNB, roadside unit (RSU) etc.) 1002 may detect or identify activity information relating to C-V2X traffic, Wi-Fi activity, or potentially other types of traffic or interference in the proximity of UE 1004. Thereupon, at 1007, the UE receives from the processing circuitry a packet that is ready for transmission. At 1001, the UE 1004 may receive this information if available. Based on information received from the base station 1002 at 1001 (or other information identified by UE 1004 itself), the UE 1004 may then perform a resource selection algorithm that identifies a resource in which to transmit and a slot configuration. For example, it is assumed in this case that Wi-Fi activity is in the proximity of UE 1004 and that C-V2X activity over the sidelink channels (e.g., PSSCH, PSCCH. etc.) is relatively high. The UE 1004 may rely on the maximum LBT duration when determining a slot configuration. Alternatively, in other cases, the UE 1004 may identify greater Wi-Fi activity in the vicinity and lower amounts of C-V2X activity, in which case UE 1004 may use a slot configuration shorter than the maximum LBT duration (e.g., based on an optimizing algorithm), or it may defer using the shortened slot configuration.

Referring still to FIG. 10, UE 1011 performs an LBT sensing operation in the slot n−1 immediately prior to the slot scheduled for transmission. During the LBT operation 1011, the UE attempts to detect energy or activity from any source that may interfere with the UE's own transmission. If, for example, UE 1011 detects energy that happens to relate to an 802.11n Wi-Fi-based transmission from a PC 1008 in the proximity of UE 1004, the UE 1004 may defer transmission (1013). Where no interfering energy is detected, UE 1004 may then transmit over one of the sidelink channels (e.g., PSSCH, PSCCH, etc.) over the next slot n. The transmission is received by the intended recipient UE 1015. It should be noted that, even though UE 1004 may have reduced the duration of its slot based on a maximum LBT, this need not have been the case and another duration may have been selected.

In slot n, a nearby UE (vehicle 1021) has scheduled its own LBT operation for the same slot n. Because UE 1004 had reduced its slot duration in this case to accommodate maximum duration LBTs, UE 1021 will not detect the energy from transmission 1017. Thus LBT operation 1019 is clear of transmission 1017.

Figure 11:
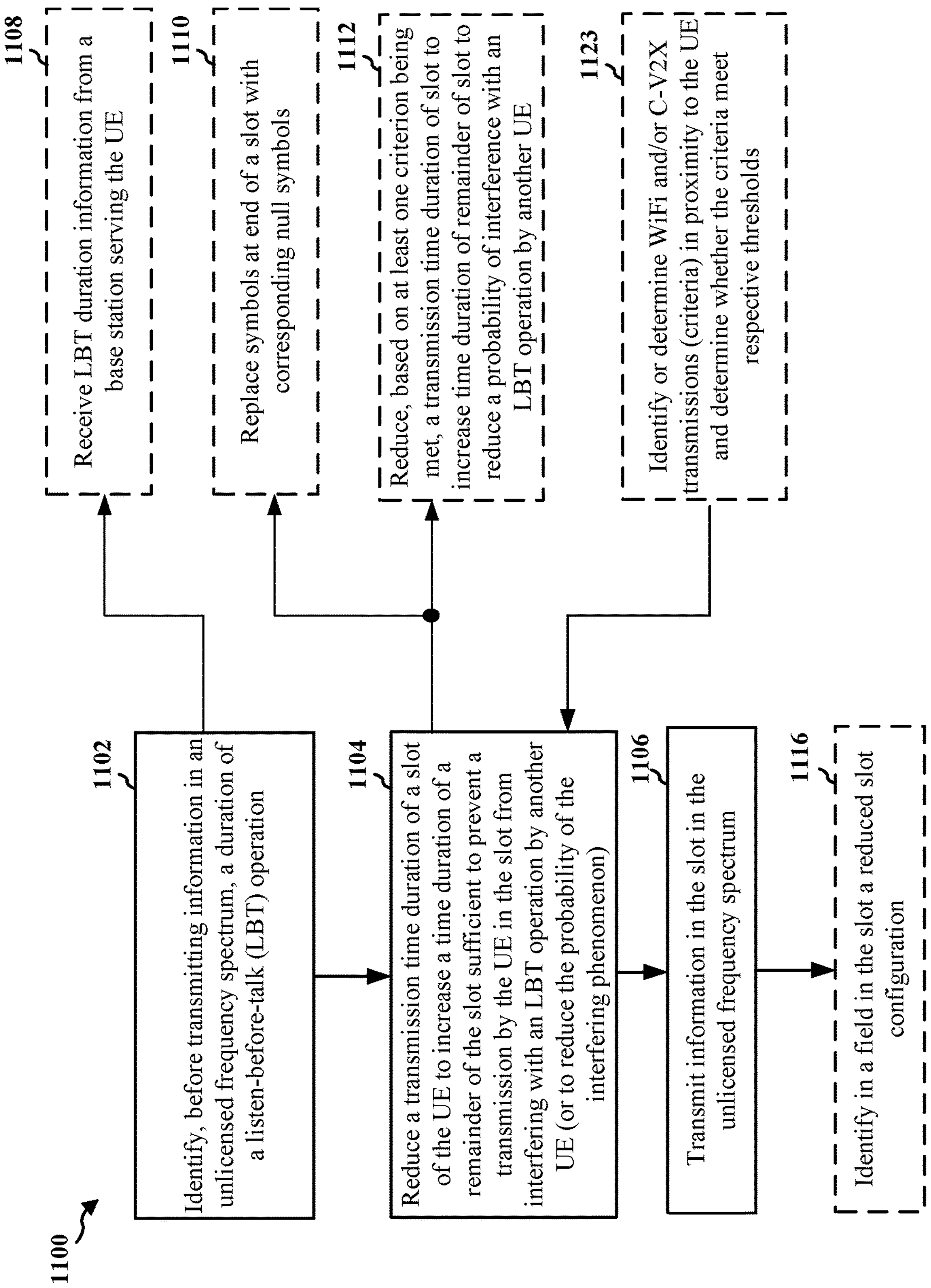
FIG. 11 is a flowchart of a method of wireless communication.

FIG. 11 is a flowchart 1100 of a method of wireless communication. The method may be performed by a UE (e.g., any of the UEs 104, 104.1, 104.2 of FIG. 1; UE 350 of FIG. 3, UEs 402 of FIG. 4, and the apparatus 1200 of FIG. 12). At 1102, the UE identifies, before transmitting information in an unlicensed frequency spectrum, a duration of a listen-before-talk (LBT) operation. At 1104, the UE reduces a transmission time duration of a remainder of the slot sufficient to prevent a transmission by the UE in the slot from interfering with an LBT operation by another UE. In other embodiments, Wi-Fi and/or C-V2X criteria identified in 1123 and, using that criteria, it is determine whether one or both of the Wi-Fi or C-V2X activity meet their respective thresholds. This information may be provided to 1104. In 1104, the amount that the slot is shortened may be tailored to reduce the probability, but not altogether prevent, the possibility of interference, but with the added benefit of transmitting more information over the longer slot. Next, at 1106, the UE may transmit information in the slot in the unlicensed frequency spectrum.

In various configurations, the identifying step 1102 may include receiving LBT duration information from a base station serving the UE (1108). Further, in various configurations, the reducing step 1104 may include replacing symbols at the end of a slot with corresponding null symbols (1110). In other configurations similar to those as described above with respect to steps 1123 and 1104, the reducing may be performed based on at least one criterion being met, with the reducing being performed to decrease a probability of interference between a transmission and another UE but not altogether eliminate the possibility of such an event (1112). The UE may also identify, using one or more bits of a field in the slot (such as an SCI field) the slot configuration (1116) for the benefit of the recipient of the packet.

Figure 12:
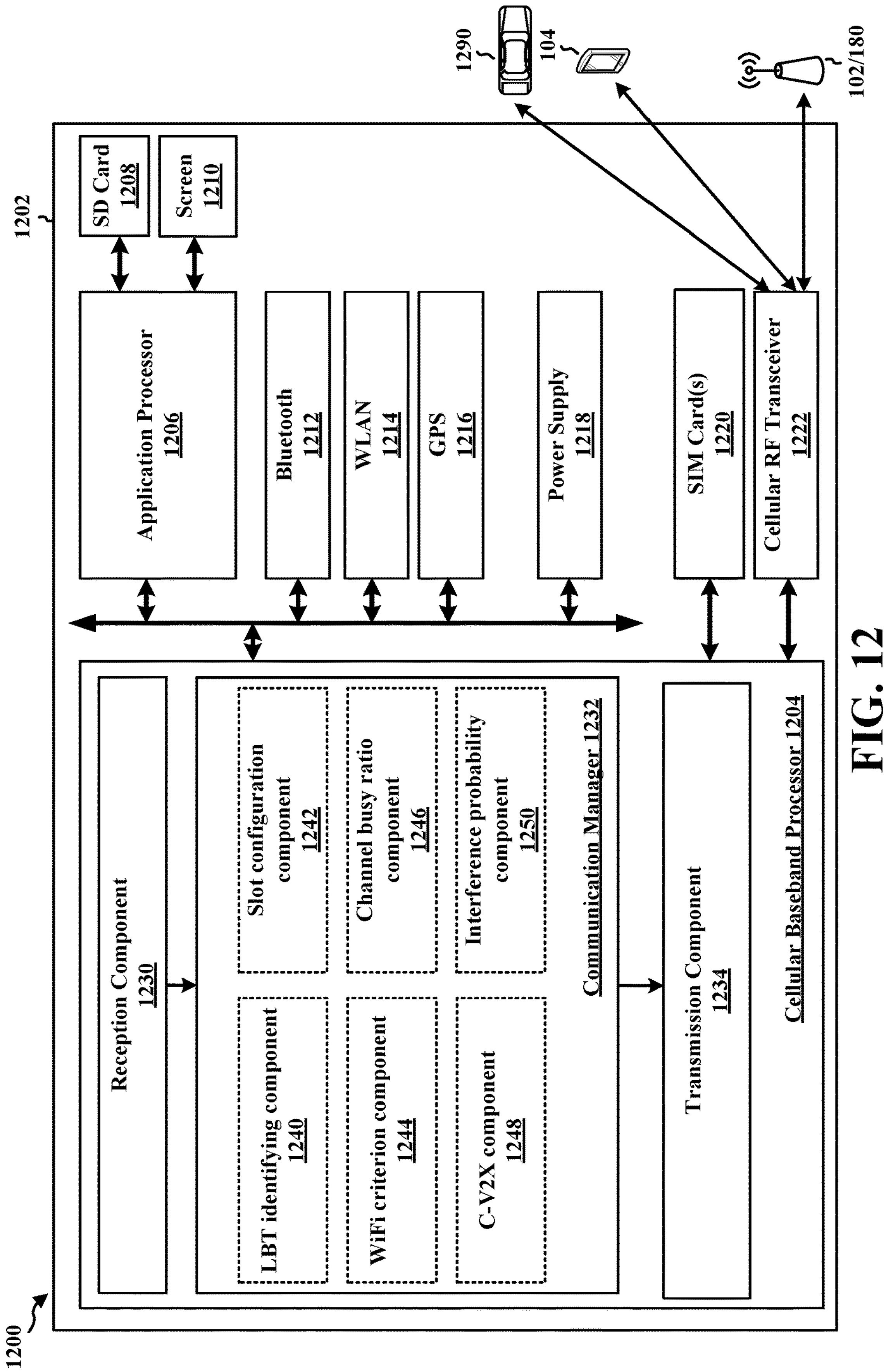
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes an LBT identifying component 1240 that is configured to receive from the network or from another source, or to otherwise determine internally, LBT duration information, e.g., as described in steps 1102 and 1108 of FIG. 11. The communication manager 1232 further includes a component 1242 that receives input in the form of LBT duration information from the component 1240 and is configured to reduce a transmission time duration of a slot of the UE to increase a time duration of a remainder of the slot sufficient to prevent a transmission by the UE in the slot from interfering with an LBT operation by another UE, or sufficient to reduce the probability of such an interfering transmission, e.g., as described in connection with steps 1104, 1110, 1112 and 1123 of FIG. 11. The communication manager 1232 further includes a Wi-Fi component 1244 that receives input in the form of LBT duration information from component 1240 and slot configuration information from component 1242 and is configured to identify or determine potential Wi-Fi transmissions in the proximity of the UE, to determine whether a threshold is met, and to provide the resulting information to component 1242 e.g., as described in connection with step 1123 of FIG. 11.

The communication manager 1232 may also include C-V2X component 1248 which is configured to identify or determine the presence and extent of C-V2X activity in a region proximate to the apparatus 1200, or to receive the information from the network via reception component 1230, as also described in step 1123 in FIG. 11. The communication manager 1232 may also include channel busy ratio (CBR) component 1246, which may exchange information with components 1244 and 1248 in order to obtain information regarding Wi-Fi and/or C-V2X communications, which in turn can be provided to component 1242. The communication manager 1232 may also include interference probability component 1250, which may receive information from any of slots 1246, 1244 and 1248 and which may be configured to determine a probability of interference with Wi-Fi transmissions, LBT operations, or other sources in order to optimize the slot configuration of component 1242.

The apparatus may include additional components that perform each of the blocks of the algorithm in the timing diagrams of FIGS. 4-10 and the aforementioned flowchart of FIGS. 11. As such, each block in the timing diagrams of FIGS. 4-10 and the aforementioned flowchart of FIGS. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for identifying, before transmitting information in an unlicensed frequency spectrum, a duration of a listen-before-talk (LBT) operation, and means for reducing a transmission time duration of a slot of the UE to increase a time duration of a remainder of the slot sufficient to prevent a transmission by the UE in the slot from interfering with an LBT operation by another UE.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The concepts recited herein provide a means for maximizing efficiency of sidelink communications in an unlicensed frequency spectrum. In some configurations, the maximum LBT operation can be determined, and the applicable slot configuration can be adjusted so that the slot is shorter than the maximum possible LBT. The positioning of the LBT is therefore such that C-V2X interference can be prevented. This in turn reduces significant latencies, particularly because the majority of sidelink transmissions do not exceed a single slot.

Where instead the criteria are such that reduction of the slot configuration potentially introduces more latency than it saves, the UE may alternatively or additionally be provided with the ability to adjust the slot size (taking into account SCS numerologies, channel access priorities, and other relevant factors) such that it reduces a probability of an interfering transmission without preventing such interference altogether. To this end, the UE can use criteria such as proximate Wi-Fi or C-V2X activity to optimize a slot configuration that provides the least latency and the greatest transmission throughput. In some arrangements, CBR or CBR-like measurements can be used to derive information about network activity proximate the UE; in other cases, the information can be provided by one or more network devices, RSUs or base stations. This accords great flexibility to adjust the slot configuration for different UEs operating in a network that are subject to different sources of potential interference. In addition, the different UEs that potentially use different slot sizes over the various sidelink channels can reserve a bit or more than one bit in the SCI field of the slot to allow recipient devices to identify the duration of the slot.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method for wireless communication at a user equipment (UE), comprising: identifying, before transmitting information in an unlicensed frequency spectrum, a duration of a listen-before-talk (LBT) operation; and reducing a transmission time duration of a slot of the UE to increase a time duration of a remainder of the slot sufficient to prevent a transmission by the UE in the slot from interfering with an LBT operation by another UE.

Example 2 is the method of example 1, further comprising: transmitting information in the slot in the unlicensed frequency spectrum.

Example 3 is the method of example 2, wherein the transmission comprises a cellular vehicle-to-everything (C-V2X) transmission.

Example 4 is the method of example 1, wherein the LBT duration comprises a maximum allowable duration based at least in part on different channel priority values.

Example 5 is the method of example 1, wherein identifying the LBT duration includes receiving LBT duration information from a base station serving the UE.

Example 6 is the method of example 1, wherein the slot comprises a slot structure for use in a cellular vehicle to everything (C-V2X) standard.

Example 7 is the method of example 1, wherein reducing a transmission time duration of a slot of the UE to increase a respective time duration of a remainder of the slot comprises replacing one or more symbols at an end of a slot with corresponding null symbols.

Example 8 is the method of example 7, wherein a number of the one or more null symbols sufficient to prevent the transmission from interfering with the LBT operation depends at least in part on a subcarrier spacing (SCS) mode.

Example 9 is the method of example 1, wherein reducing a transmission time duration of a slot of the UE further comprises reducing, based on at least one criterion being met, a transmission time duration of the slot to increase the time duration of the remainder of the slot sufficient to reduce a probability of a transmission by the UE interfering with an LBT operation by the another UE.

Example 10 is the method of example 9, further comprising transmitting information in the slot in the unlicensed frequency spectrum.

Example 11 is the method of example 9, wherein the at least one criterion comprises one or both of: whether a frequency of Wi-Fi-based transmissions in a proximity of the UE is at or below a first threshold; or whether a frequency of cellular vehicle-to-everything (C-V2X)-based transmissions in the proximity of the UE is at or above a second threshold.

Example 12 is the method of example 11, further comprising maintaining, based on the criteria not meeting the respective first and second thresholds, the transmission time duration of the slot as originally configured.

Example 13 is the method of example 11, wherein reducing the transmission time duration of a slot of the UE is performed based on the frequencies of transmission not meeting at least one of the first or second thresholds.

Example 14 is the method of example 11, further comprising using channel busy ratio (CBR) measurements to determine one or both of the first or second thresholds.

Example 15 is the method of example 11, wherein one or both of the first and second thresholds are obtained by the UE from a base station.

Example 16 is the method of example 1, further comprising including a field in the slot identifying a reduced slot configuration.

Example 17 is an apparatus for wireless communication comprising a memory; and at least one processor coupled to the memory and configured to perform any of examples 1-16.

Example 18 is an apparatus for wireless communications comprising means for performing any of examples 1-16.

Example 19 is a computer-readable medium storing code, the code when executed by at least one processor causes the at least one processor to perform any of examples 1-16.

What is claimed is:

1. A method for wireless communication at a user equipment (UE), comprising:

identifying, before transmitting information in an unlicensed frequency spectrum, a duration of a listen-before-talk (LBT) operation; and reducing a transmission time duration of a slot of the UE, wherein the reducing the transmission time duration causes an increase in a time duration of a remainder of the slot, wherein the increase in the time duration of the remainder of the slot prevents a transmission by the UE in the slot from interfering with an LBT operation by another UE, wherein the transmission time duration of the slot is reduced based on at least one criterion being met, wherein the increase in the time duration of the remainder of the slot reduces a probability of the transmission by the UE interfering with the LBT operation by the another UE.

2. The method of claim 1, further comprising:
transmitting information in the slot in the unlicensed frequency spectrum.

3. The method of claim 2, wherein the transmission comprises a cellular vehicle-to-everything (C-V2X) transmission.

4. The method of claim 1, wherein the LBT duration comprises a maximum allowable duration based at least in part on different channel priority values.

5. The method of claim 1, wherein identifying the LBT duration includes receiving LBT duration information from a base station serving the UE.

6. The method of claim 1, wherein the slot comprises a slot structure for use in a cellular vehicle to everything (C-V2X) standard.

7. The method of claim 1, wherein reducing a transmission time duration of a slot of the UE to increase a respective time duration of a remainder of the slot comprises replacing one or more symbols at an end of a slot with corresponding null symbols.

8. The method of claim 7, wherein a number of the one or more null symbols sufficient to prevent the transmission from interfering with the LBT operation depends at least in part on a subcarrier spacing (SCS) mode.

9. An apparatus for wireless communication, comprising:
a memory; and
at least one processor coupled to the memory and configured to:
identify, before transmitting information in an unlicensed frequency spectrum, a duration of a listen-before-talk (LBT) operation; and
reduce a transmission time duration of a slot of the UE,
wherein the transmission time duration is reduced by the at least one processor configured to cause an increase in a time duration of a remainder of the slot,
wherein the increase in the time duration of the remainder of the slot prevents a transmission by the UE in the slot from interfering with an LBT operation by another UE,
wherein the transmission time duration of the slot is reduced based on at least one criterion being met,
wherein the increase in the time duration of the remainder of the slot reduces a probability of the transmission by the UE interfering with the LBT operation by the another UE.

10. The apparatus of claim 9, wherein the transmission comprises a cellular vehicle-to-everything (C-V2X) transmission.

11. The apparatus of claim 9, wherein the LBT duration comprises a maximum allowable duration based at least in part on different channel priority values.

12. The apparatus of claim 9, wherein the at least one processor is further configured to receive LBT duration information from a base station serving the UE.

13. The apparatus of claim 9, wherein the slot comprises a slot structure for use in a cellular vehicle to everything (C-V2X) standard.

14. The apparatus of claim 9, wherein the at least one processor is further configured to replace one or more symbols at an end of a slot with corresponding null symbols.

15. The apparatus of claim 14, wherein a number of the one or more null symbols sufficient to prevent the transmission from interfering with the LBT operation depends at least in part on a subcarrier spacing (SCS) mode.

16. The apparatus of claim 9, wherein the at least one criterion comprises one or both of:
whether a frequency of Wi-Fi-based transmissions in a proximity of the UE is at or below a first threshold; or
whether a frequency of cellular vehicle-to-everything (C-V2X)-based transmissions in the proximity of the UE is at or above a second threshold.

17. The apparatus of claim 16, wherein the at least one processor is further configured to maintain, based on the at least one criterion not meeting the respective first and second thresholds, the transmission time duration of the slot as originally configured.

18. An apparatus for wireless communication, comprising:
means for identifying, before transmitting information in an unlicensed frequency spectrum, a duration of a listen-before-talk (LBT) operation; and
means for reducing a transmission time duration of a slot of the UE,
wherein the means for reducing the transmission time duration causes an increase in a time duration of a remainder of the slot,
wherein the increase in the time duration of the remainder of the slot prevents a transmission by the UE in the slot from interfering with an LBT operation by another UE,
wherein the transmission time duration of the slot is reduced based on at least one criterion being met,
wherein the increase in the time duration of the remainder of the slot reduces a probability of the transmission by the UE interfering with the LBT operation by the another UE.

19. The apparatus of claim 18, wherein the transmission comprises a cellular vehicle-to-everything (C-V2X) transmission.

20. The apparatus of claim 18, wherein the LBT duration comprises a maximum allowable duration based at least in part on different channel priority values.

21. The apparatus of claim 18, wherein the means for identifying the LBT duration is further configured to receive LBT duration information from a base station serving the UE.

22. The apparatus of claim 18, wherein the slot comprises a slot structure for use in a cellular vehicle to everything (C-V2X) standard.

23. The apparatus of claim 18, wherein the means for reducing is further configured to replace one or more symbols at an end of a slot with corresponding null symbols.

24. The apparatus of claim 23, wherein a number of the one or more null symbols sufficient to prevent the transmission from interfering with the LBT operation depends at least in part on a subcarrier spacing (SCS) mode.

25. A non-transitory computer-readable medium storing computer executable code, the code when executed by at least one processor causing the at least one processor to:
identify, before transmitting information in an unlicensed frequency spectrum, a duration of a listen-before-talk (LBT) operation; and
reduce a transmission time duration of a slot of a user equipment (UE),
wherein the transmission time duration is reduced by the at least one processor configured to cause an increase in a time duration of a remainder of the slot,
wherein the increase in the time duration of the remainder of the slot by the at least one processor causes a prevention of a transmission by the UE in the slot from interfering with an LBT operation by another UE, wherein the transmission time duration of the slot is reduced based on at least one criterion being met, wherein the increase in the time duration of the remainder of the slot by the at least one processor causes a reduction in a probability of the transmission by the UE interfering with the LBT operation by the another UE.

26. The computer-readable medium of claim 25, further comprising code to receive LBT duration information from a base station serving the UE.

27. The computer-readable medium of claim 25, wherein the LBT duration comprises a maximum allowable duration based at least in part on different channel priority values.

28. The computer-readable medium of claim 25, wherein the slot comprises a slot structure for use in a cellular vehicle to everything (C-V2X) standard.

29. The computer-readable medium of claim 25, wherein the at least one criterion comprises one or both of:

whether a frequency of Wi-Fi-based transmissions in a proximity of the UE is at or below a first threshold; or whether a frequency of cellular vehicle-to-everything (C-V2X)-based transmissions in the proximity of the UE is at or above a second threshold.

30. The computer-readable medium of claim 29, wherein the at least one processor is further configured to maintain, based on the at least one criterion not meeting the respective first and second thresholds, the transmission time duration of the slot as originally configured.

* * * * *